(12) United States Patent
Endal et al.

(10) Patent No.: US 10,422,443 B2
(45) Date of Patent: Sep. 24, 2019

(54) DIRECT TIE-IN OF PIPELINES BY ADDED CURVATURE

(71) Applicant: Statoil Petroleum AS, Stavanger (NO)

(72) Inventors: Geir Endal, Jessheim (NO); Jens Haugen, Eiksmarka (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 15/548,046

(22) PCT Filed: Feb. 22, 2016

(86) PCT No.: PCT/NO2016/050030
§ 371 (c)(1),
(2) Date: Aug. 1, 2017

(87) PCT Pub. No.: WO2016/137333
PCT Pub. Date: Sep. 1, 2016

(65) Prior Publication Data
US 2018/0017186 A1    Jan. 18, 2018

(30) Foreign Application Priority Data

Feb. 24, 2015 (GB) .................................. 1503069.5

(51) Int. Cl.
*F16L 1/26* (2006.01)
*F16L 1/24* (2006.01)
(Continued)

(52) U.S. Cl.
CPC ............ *F16L 1/26* (2013.01); *E21B 43/0107* (2013.01); *F16L 1/23* (2013.01); *F16L 1/24* (2013.01); *F16L 1/202* (2013.01)

(58) Field of Classification Search
CPC ....... F16L 1/12; F16L 1/23; F16L 1/24; F16L 1/26; E21B 43/0107
(Continued)

(56) References Cited

U.S. PATENT DOCUMENTS 3,378,067 A    4/1968    Leonard et al.
3,744,258 A    7/1973    Lochridge et al.
(Continued)

FOREIGN PATENT DOCUMENTS

GB    1 559 657        1/1980
GB    2 267 945 A    12/1993
(Continued)

OTHER PUBLICATIONS

International Search Report issued in PCT/NO2016/050030 (PCT/ISA/210), dated May 27, 2016.
(Continued)

*Primary Examiner* — Sean D Andrish
(74) *Attorney, Agent, or Firm* — Birch, Stewart, Kolasch & Birch, LLP

(57) ABSTRACT

A method and apparatus for direct tie-in of pipelines are disclosed. An apparatus is attached to a portion of a pipeline, the apparatus including a tensioning member and a buoyancy element attached to the tensioning member such that, when submerged, the pipeline is deflected as a result of a buoyancy force tensioning the tensioning member, and on releasing the buoyancy element, direct tie-in of the pipeline is performed.

18 Claims, 5 Drawing Sheets

(51) Int. Cl.
*E21B 43/01* (2006.01)
*F16L 1/23* (2006.01)
*F16L 1/20* (2006.01)

(58) Field of Classification Search
USPC .......................................... 405/158, 171, 172
See application file for complete search history.

(56) References Cited

U.S. PATENT DOCUMENTS

| | | | |
|---|---|---|---|
| 3,893,305 | A | 7/1975 | Walker |
| 4,075,862 | A | 2/1978 | Ames |
| 4,098,214 | A | 7/1978 | Ogura |
| 4,132,084 | A | 1/1979 | Francisco-Arnold |
| 4,135,844 | A | 1/1979 | Lamy |
| 4,225,270 | A * | 9/1980 | Dareing .............. E21B 43/0135 166/346 |
| 4,399,601 | A * | 8/1983 | Ayers ...................... B63B 21/60 29/407.08 |
| 4,704,049 | A * | 11/1987 | Vilain ...................... F16L 1/14 405/158 |
| 4,909,670 | A * | 3/1990 | Harrison ................... F16L 1/16 254/134.3 SC |
| 8,622,137 | B2 * | 1/2014 | Childres ............... E21B 19/002 166/338 |
| 2003/0221602 | A1 | 12/2003 | Guinn et al. |
| 2004/0062611 | A1 | 4/2004 | Endal |
| 2006/0062635 | A1 | 3/2006 | Mungall et al. |
| 2006/0067792 | A1 | 3/2006 | Joshi et al. |
| 2008/0232905 | A1 | 9/2008 | Duroch et al. |
| 2014/0338919 | A1 | 11/2014 | Pionetti |
| 2018/0010713 | A1 * | 1/2018 | Endal ....................... F16L 1/163 |

FOREIGN PATENT DOCUMENTS

| | | | |
|---|---|---|---|
| GB | 2492414 A | | 1/2013 |
| NO | 314056 B1 | | 1/2003 |
| WO | WO 02/057674 A1 | | 7/2002 |
| WO | WO 2011/008593 | * | 1/2011 |
| WO | WO 2011/008593 A1 | | 1/2011 |
| WO | WO 2015/149843 A1 | | 10/2015 |

OTHER PUBLICATIONS

United Kingdom Search Report for GB1503069.5, dated Oct. 23, 2015.
Written Opinion of the International Searching Authority issued in PCT/NO2016/050030 (PCT/ISA/237), dated May 27, 2016.
U.S. Office Action dated Oct. 18, 2018 for U.S. Appl. No. 15/546,225.
U.S. Office Action, dated Feb. 25, 2019, for U.S. Appl. No. 15/546,225.

* cited by examiner

DIRECT TIE-IN OF PIPELINES BY ADDED CURVATURE

FIELD OF THE INVENTION

This is invention relates to pipeline laying technology.

BACKGROUND

Various methods exist to connect a pipeline end to subsea structures. Normally, a separate spool or jumper is used to connect the pipeline end and the subsea structure, which adds significant cost. It is advantageous; however, if a direct tie-in method can be used. Three different types of direct subsea tie-in exist:
1. Direct pull-in
2. Deflect-to-connect
3. Connect and lay-away Direct tie-in by conventional methods (direct pull-in, deflect-to-connect, connect and lay-away) all have challenges with large forces on the connection, and hence requirement for a large area for lateral deflection of the pipeline, to ensure acceptable forces during tie-in and the subsequent thermal expansion in the operational phase. Another challenge is large pipeline stresses in the deflected section close to the end of the pipeline.

It is known to the applicant that technology to enable direct tie-in by adding local residual curvature towards the end of the pipeline exists. Such technology is, however, linked to installation by the reel-lay method only.

SUMMARY

It is an object of the invention to provide a method and apparatus for direct tie-in of a pipeline, the method and apparatus applicable for pipelines installed in particular by reel-lay, J-lay, S-lay and tow-out methods.

According to one aspect of the invention there is provided a method for direct tie-in of a pipeline, the method comprising attaching a tensioning member along a portion of the pipeline at at least two locations; attaching a buoyancy element to the tensioning member to deflect the portion of the pipeline; and releasing the buoyancy element, thereby allowing a direct tie-in of the pipeline.

The tensioning member may be attached to the pipeline by clamps. The tensioning member may be attached to the pipeline while the pipeline is laid on the lay vessel.

The buoyancy element may be attached to the tensioning member on the lay vessel or during preparation for tow-out, or alternatively underwater.

The buoyancy element may be attached to the tensioning member by a connecting member. There may be provided a displacement control member between the tensioning member and the pipeline. The connecting member and the displacement control member may form a single member.

According to another embodiment, the buoyancy element may be arranged at the seabed. The buoyancy element may be anchored to the seabed via an anchoring member by a weight element. The weight element may be a clump weight.

The buoyancy element may be attached to the tensioning member by engaging a hook member with the tensioning member. This could be carried out by a remotely operated underwater vehicle (ROV).

There may be provided a displacement control member between the tensioning member and the pipeline.

The buoyancy element may be released from the tensioning member by a remotely operated underwater vehicle.

According to the invention there is provided an apparatus for direct tie-in of a pipeline, the apparatus comprising a tensioning member for attaching along a portion of a pipeline at at least two locations; a buoyancy element for attaching to the tensioning member to deflect the portion of the pipeline.

DRAWINGS

FIG. 5A is a side view of the apparatus in use prior to direct tie-in.

FIG. 5B is a side view of the apparatus in use subsequent to direct tie-in.

FIG. 8B shows the buoyancy element released subsequent to direct tie-in of a pipeline with.

DETAILED DESCRIPTION

Figure 1:
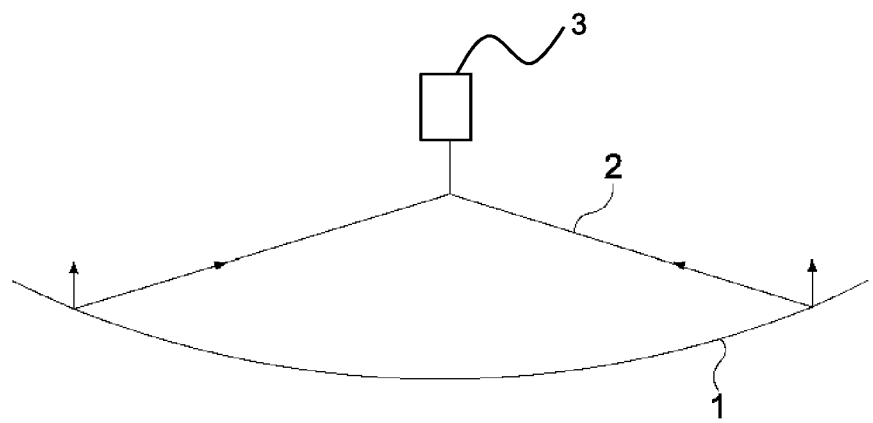
FIG. 1 is a schematic side view of apparatus in accordance with an embodiment and a section of pipeline.

A method and apparatus for direct tie-in of pipelines by added curvature are illustrated in the accompanying figures. As will be clear from the following discussion, and as shown in FIG. 1, the pipeline 1 is deflected during an exemplary pipeline direct tie-in process by attaching the apparatus to a portion of the pipeline 1; the apparatus comprising: a tensioning member 2, and a buoyancy element 3 attached to the tensioning member 2. FIG. 1 shows a tensioning member 2 attached (typically proximate end portions of the tensioning member) at two locations to a section of pipeline. The two attachment locations are sufficiently spaced to ensure that the tensioning member 2 is pulled taught along the section of the pipeline. A buoyancy element 3 is attached to the tensioning member 2. The buoyancy element 3 is used to create tension in the attached tensioning member 2 on the pipeline 1, whereby the pipeline 1 is forced to deflect. The added deflected shape appears once the pipeline 1 portion with the buoyancy element 3 attached is submerged. On release of the buoyancy element 3 from the tensioning member 2, the created tension and hence pipeline deflection is reduced; a tie-in of the pipeline can then be performed.

The tensioning member 2 may be any kind of elongated member such as a wire, a cable, a rope, a rod or similar. If the tensioning member is a rigid member it may be formed of two parts, connected by a hinge or similar to enable deflection of the tensioning member.

Figure 2:
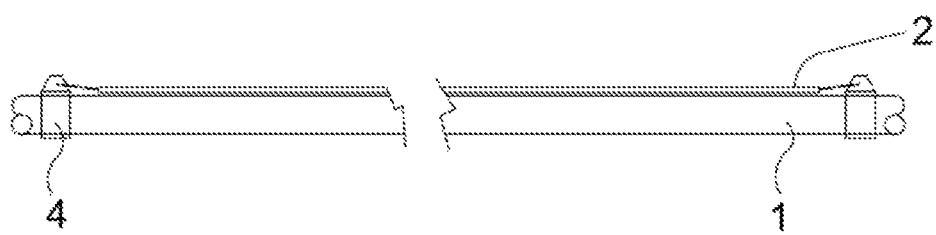
FIG. 2 is a schematic side view of a section of a pipeline with a tensioning member attached by clamps.

FIG. 2 shows a tensioning member attached to the pipeline 1 by clamps 4. As shown in the figure, the tensioning member 2 can be attached to the pipeline 1 at at least two locations by clamps 4 along a portion of the pipeline 1. It will be appreciated by the person skilled in the art that the tensioning member 2 can be attached to the pipeline by any convenient means. It is convenient if the portion of the tensioning member 2 between the clamps 4 is substantially taut.

While the pipeline 1 lies on the lay vessel, the tensioning member 2 is attached along the pipeline 1, preferably close to the end of the pipeline, in order to prepare for pipeline lateral deflection for subsequent direct tie-in, e.g. to a subsurface structure.

According to one embodiment, the buoyancy element 3 is attached to the tensioning member 2 prior to submerging of the pipeline. This could preferably occur on the lay vessel, or during preparation for tow-out. The buoyancy element however, may also be attached to the tensioning member underwater if required.

Figure 3:
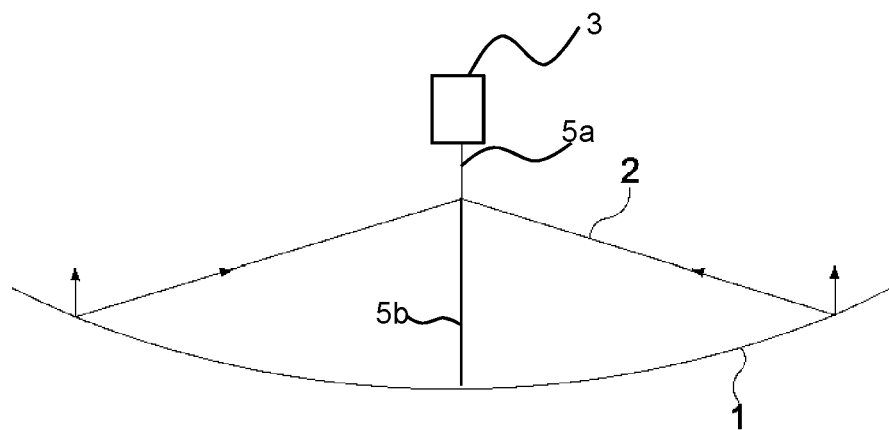
FIG. 3 is a schematic side view of the apparatus attached to a pipeline.

FIG. 3 shows the tensioning member 2 attached to the pipeline 1, with the buoyancy element 3 attached to the tensioning member 2 at a mid-portion thereof by a connecting member 5a. Additionally, a displacement control member 5b connects the buoyancy element 3 to the pipeline 1. The displacement control element is used to control/limit the magnitude of deflection of the tensioning member (and therefore the deflection of the pipeline section) as necessary. The displacement control member 5b provides one way of controlling the degree of deflection of the pipeline section and is optional. No means for controlling the deflection or alternative means may be provided. The connecting member 5a and the displacement control member 5b can conveniently be formed from a single member fixedly attached to the tensioning member 2 at a point along the length of the single member.

Figure 4:
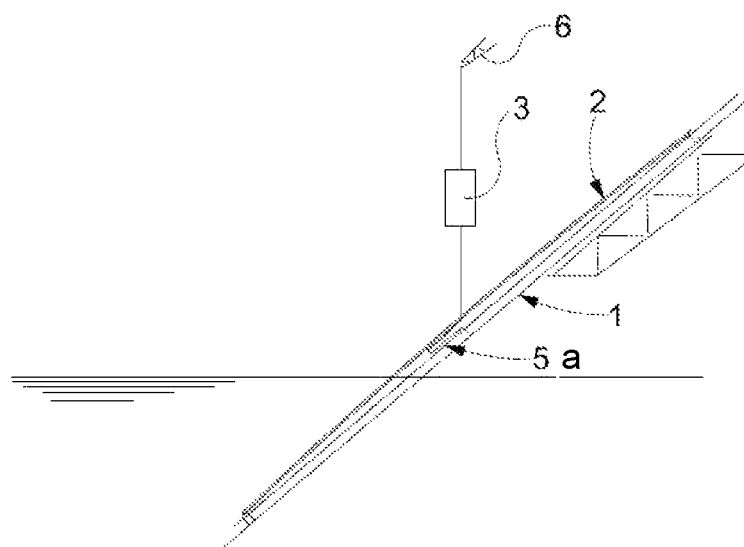
FIG. 4 is a side view of a pipeline with the apparatus attached on a lay vessel.

FIG. 4 shows deployment of a pipeline from a lay vessel, with the apparatus attached. During overboarding from the lay vessel, the buoyancy element 3 is suspended by a vessel crane 6 and released from the crane 6 when entering the water.

Figure 5A:
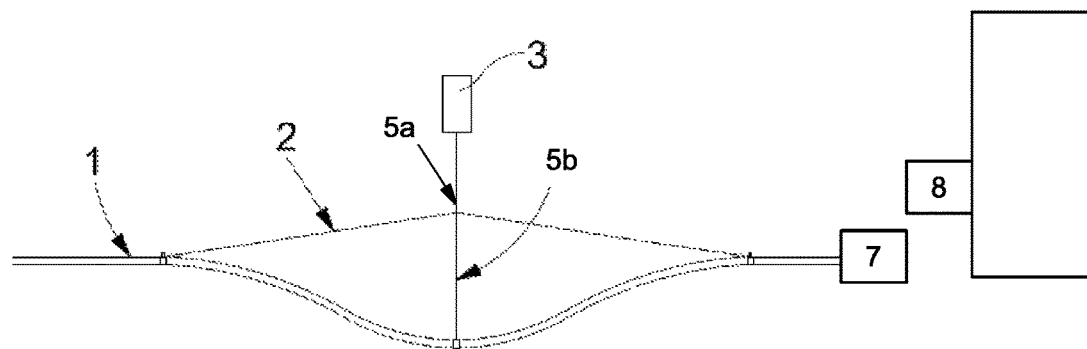
Figure 5B:
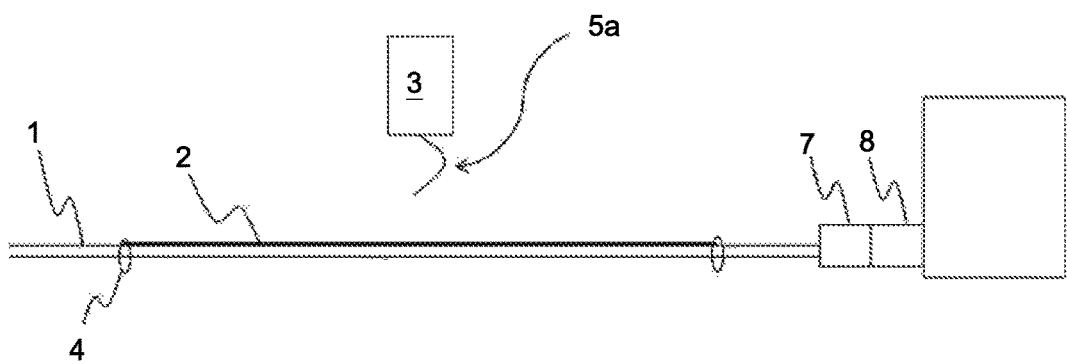

FIG. 5A illustrates a pipeline portion with the buoyancy element 3 attached via a connecting member 5a and displacement control member 5b, is submerged, the buoyancy force tensions the tensioning member 2, and the pipeline 1 will take the intended deflected shape. A hub 7 located at the end of the pipeline 1 is capable for direct connection with a hub 8 at a subsea structure. When in place and ready for direct tie-in, the buoyancy element 3 is released, and hub 7 at the pipeline end moves to interconnecting hub 8 on the subsea structure, for direct connection, without the need for any in-between structure. The direct connection is shown in FIG. 5B.

The buoyancy element may for example be released by a remotely operated underwater vehicle (ROV—not shown) by cutting connecting member 5a.

Figure 6:
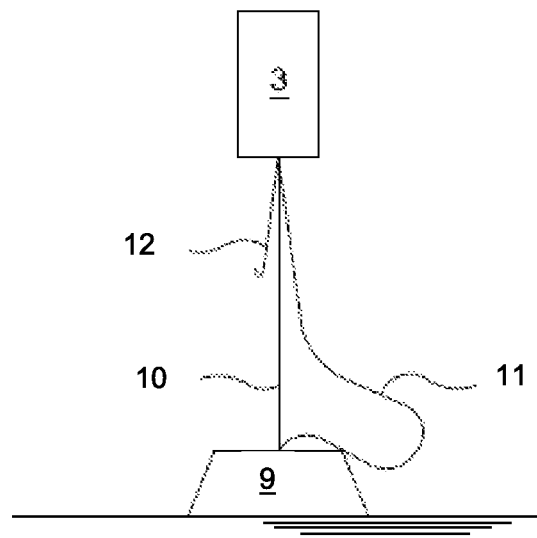
FIG. 6 shows a buoyancy element arranged at the seabed and anchored to the seabed.

In another embodiment of the invention, shown in FIGS. 6-8B, the buoyancy element 3 can be arranged on the seabed close to the pipeline 1 end. FIG. 6 illustrates the buoyancy element 3 being held in a controlled position by a weight element 9 via an anchoring member 10. The buoyancy element arrangement may also include a displacement control member 11. As shown on FIG. 7, the buoyancy element 3 can be attached to the tensioning member 2 by a connecting member such as a hook member 12. However, any other means may be used for attaching the buoyancy element 3 to the tensioning member 2.

Figure 7:
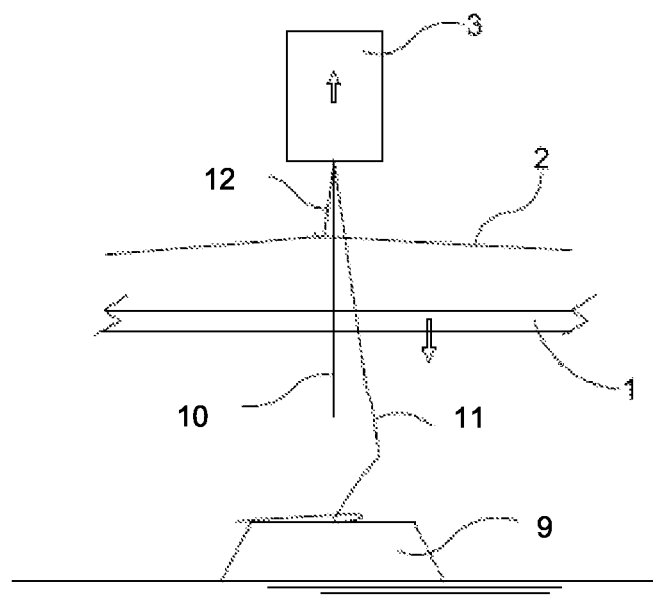
FIG. 7 shows the buoyancy element attached to the tensioning member, wherein the tensioning member is attached to the pipeline.

As illustrated by FIG. 7, after the pipeline 1 has been laid in the tie-in porch (not shown), the buoyancy element 3 is used to create tension in the attached tensioning member 2 on the pipeline 1, by cutting anchoring member 10. In the embodiment, as shown in the figure, anchoring member 10 is cut; the buoyancy element 3 rises, creating tension in the attached tensioning member 2. Upward travel of the buoyancy element 3 is restricted by displacement control member 11 which can be used to control/limit the magnitude of deflection as necessary. This function is similar to that of displacement control member 5b described above.

Figure 8A:
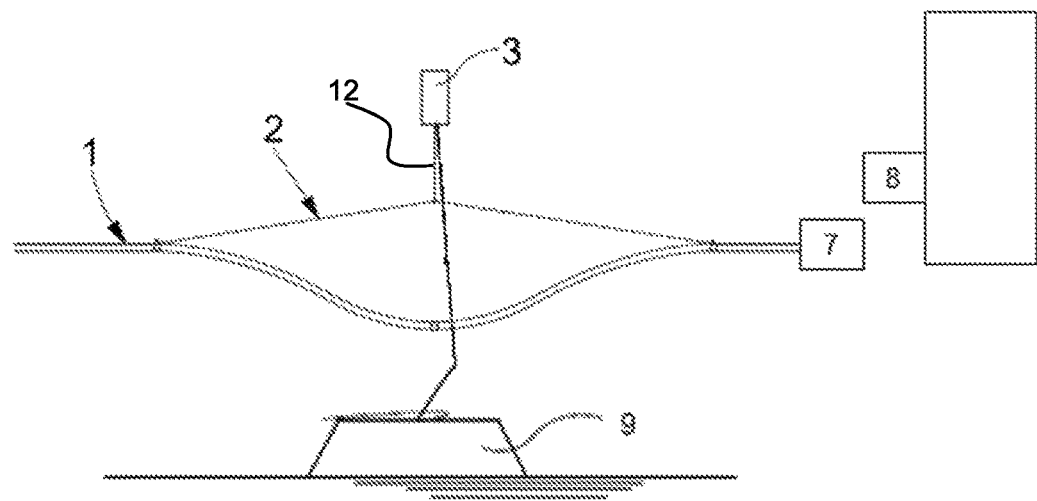
FIG. 8A shows the buoyancy element attached to the tensioning member prior to direct tie-in of a pipeline.

As shown in FIG. 8A, following disengagement of anchoring member 10, and engagement of hook member 12, pipeline lateral deflection is created, in readiness for later removal of the buoyancy element 3, following installation of the pipeline 1, and in readiness for direct tie-in.

Figure 8B:
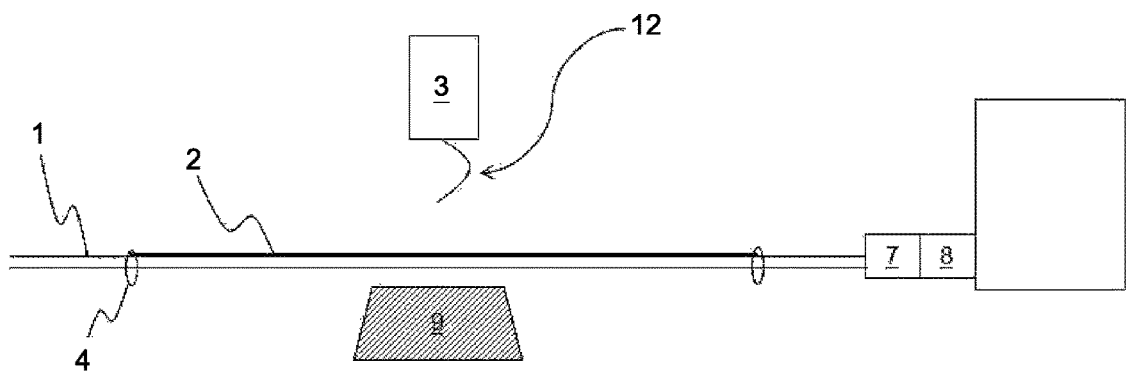

As shown in FIG. 8B, when in place and ready for direct tie-in, the buoyancy element 3 is released by cutting hook member 12; and hub 7 at the pipeline 1 end moves to hub 8 on the subsea structure, for direct connection.

The buoyancy element may for example be released by a remotely operated underwater vehicle (ROV—not shown) by cutting hook member 12.

The Invention is applicable for pipelines installed by any of, for example reel-lay, J-lay, S-lay and tow-out.

Further deflection can be achieved in the methods of the invention by adding external weight to a portion of the pipeline, wherein tensioning member is attached.

By using the described method and apparatus, the invention provides a low cost solution for tie-ins, as a separate spool or jumper for tie-in is not needed.

The invention reduces forces acting on the tie-in hub/connection, as lateral deflection towards the end of the pipeline ensures low axial force to cause lateral deflections under varying operating loads.

The invention claimed is:

1. A method of direct tie-in of a pipeline, the method comprising the steps of:
   attaching a tensioning member to the pipeline, wherein said tensioning member is attached at two locations along a portion of the pipeline;
   attaching a buoyancy element to the tensioning member between said two locations before or after submerging the pipeline, whereby the portion of the pipeline is caused to deflect;
   attaching a displacement control member between at least one of the tensioning member and the pipeline, the pipeline and the buoyancy element, and the buoyancy element and an anchor;
   releasing the buoyancy element to reduce the deflection in the portion of the pipeline; and
   after releasing the buoyancy element, performing a direct tie-in of the pipeline.

2. The method according to claim 1, wherein the tensioning member is attached to the pipeline by clamps.

3. The method according to claim 1, wherein the tensioning member is attached to the pipeline at a location of the direct tie-in.

4. The method according to claim 1, wherein the tensioning member is attached during the pipeline laying on a lay vessel.

5. The method according to claim 1, wherein the buoyancy element is attached to the tensioning member on a lay vessel.

6. The method according to claim 1, wherein the buoyancy element is attached to the tensioning member during preparation for tow-out.

7. The method according to claim 1, wherein the buoyancy element is attached to the tensioning member underwater.

8. The method according to claim 1, wherein the buoyancy element is attached to the tensioning member via a connecting member.

9. The method according to claim 1, wherein the displacement control member is provided between the tensioning member and the pipeline.

10. The method according to claim 1, wherein the buoyancy element is attached to the tensioning member via a connecting member and the displacement control member is provided between the tensioning member and the pipeline, and wherein the connecting member and the displacement control member form a single member.

11. The method according to claim 1, wherein prior to attachment to the tensioning member, the buoyancy element is arranged at the seabed.

12. The method according to claim 11, wherein the buoyancy element is anchored to the seabed via an anchoring member by a weight element.

13. The method according to claim 12, wherein the weight element is a clump weight.

14. The method according to claim 12, wherein the displacement control member is provided between the buoyancy element and the weight element.

15. The method according to claim 11, wherein the buoyancy element is attached to the tensioning member by engaging a hook member with the tensioning member.

16. The method according to claim 11, wherein the buoyancy element is attached to the tensioning member with the use of a remotely operated underwater vehicle.

17. The method according to claim 1, wherein the buoyancy element is released by a remotely operated underwater vehicle.

18. The method according to claim 1, wherein the deflection of the portion of the pipeline causes a hub at an end of the pipeline to move into a position for the direct tie-in.

* * * * *